US012731846B1

(12) United States Patent
Henken

(10) Patent No.: US 12,731,846 B1
(45) Date of Patent: Sep. 8, 2026

(54) CORDLESS RECHARGEABLE 12-VOLT/24-VOLT DC POWER SUPPLY

(71) Applicant: United States of America as represented by the Administrator of NASA, Washington, DC (US)

(72) Inventor: Andrew Henken, Stennis Space Center, MS (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 631 days.

(21) Appl. No.: 18/231,942

(22) Filed: Aug. 9, 2023

(51) Int. Cl.
*H01M 50/247* (2021.01)
*H01M 10/44* (2006.01)

(52) U.S. Cl.
CPC ....... *H01M 50/247* (2021.01); *H01M 10/441* (2013.01); *H01M 2220/30* (2013.01)

(58) Field of Classification Search
CPC ............. H01M 50/247; H01M 10/441; H01M 2220/30
USPC .......................................................... 320/120
See application file for complete search history.

(56) References Cited

U.S. PATENT DOCUMENTS 5,979,412 A * 11/1999 Werner ................... F02D 41/20 123/490
6,201,370 B1 * 3/2001 Reller ................. H01M 50/202 320/107
6,437,544 B1 * 8/2002 Yang ....................... H02J 7/345 320/167
7,635,965 B2 * 12/2009 Hinckson .................. H02J 9/04 307/17
7,795,837 B1 * 9/2010 Haun ...................... H02S 10/40 320/101
9,362,764 B2 * 6/2016 Farkas ...................... H02J 7/00
10,099,308 B2 * 10/2018 Vogel .................. B23K 9/1081
(Continued)

FOREIGN PATENT DOCUMENTS

CA 2785497 C * 1/2017 ............. H05B 41/40
CN 112065506 A * 12/2020 ........... G01B 11/303
(Continued)

OTHER PUBLICATIONS

L. -Q. Soh and C. -C. D. Tiew, "Building of a Portable Solar AC & DC Power Supply," 2014 5th International Conference on Intelligent Systems, Modelling and Simulation, Langkawi, Malaysia, 2014, pp. 445-451 (Year: 2014).*

*Primary Examiner* — M Baye Diao
(74) *Attorney, Agent, or Firm* — Heather Goo; Matthew F. Johnston; Trenton J. Roche

(57) ABSTRACT

The present invention includes a portable, cordless, rechargeable 12 volt/24-volt DC power supply. The power supply includes a relatively small box or case with two (2) 12-volt rechargeable batteries inside, which connect to a jack for plugging in a standard 12-volt battery charger, a 2-pin power connector that is commonly used to connect to items under test such as solenoid valves, and two switches—one which turns the power on/off, and the other which changes the power at the 2-pin connector between 12-volts and 24-volts. A power cord plugs into the 2-pin connector on the case and connects to the test items, such as commonly used solenoid valves, to provide a power supply to test the solenoid valves for electromechanical problems, or simply to cycle the valves if there is no control system to do so.

7 Claims, 2 Drawing Sheets

(56) References Cited

U.S. PATENT DOCUMENTS

| | | | | |
|---|---|---|---|---|
| 10,862,176 | B2 * | 12/2020 | Degelau | B25F 5/00 |
| 11,745,614 | B2 * | 9/2023 | O'Connor | B60L 53/16 320/109 |
| 2006/0125445 | A1 * | 6/2006 | Cao | H02J 7/663 320/112 |

FOREIGN PATENT DOCUMENTS

| | | | | |
|---|---|---|---|---|
| EP | 0601232 | A1 * | 6/1994 | H02J 7/485 |
| IE | 20020510 | A1 * | 12/2002 | F02N 11/08 |

* cited by examiner

CORDLESS RECHARGEABLE 12-VOLT/24-VOLT DC POWER SUPPLY

ORIGIN OF THE INVENTION

The invention described herein was at least in-part made by an employee of the United States Government and may be manufactured or used by or for the Government of the United States of America for governmental purposes without the payment of any royalties thereon or therefor.

BACKGROUND OF THE INVENTION

1. Field of the Invention

The present invention relates to a portable, cordless, rechargeable power supply. More particularly, the present invention relates to a 12-volt/24-volt cordless rechargeable direct current (DC) power supply, which can be used to troubleshoot and cycle a desired item, such as a solenoid valve, to determine if there are any mechanical problems.

2. Description of the Related Art

Solenoid valves are electromechanically operated valves that regulate fluids, and normally have a two-port design to regulate flow. A three-port or more design, switches the flows between ports. Multiple solenoid valves are placed together on a manifold. The valves are used in a variety of application areas.

However, troubleshooting a solenoid valve to determine if there are any mechanical problems, can be difficult. Further, when a new fluidics system is built but the electrical or controls system is not yet configured to cycle the solenoid valve, presents an additional challenge.

Accordingly, a device which can address these drawbacks is desired.

SUMMARY OF THE INVENTION

The present invention includes a portable, cordless, rechargeable 12 volt/24-volt direct current (DC) power supply which can be used to troubleshoot and cycle a desired item, such as a solenoid valve, to determine if there are any mechanical problems. The power supply includes a relatively small box or case with two (2) 12-volt rechargeable batteries inside, which connect to a jack for plugging in a standard 12-volt battery charger, a 2-pin power connector that is commonly used to connect to items under test such as solenoid valves, and two switches-one which turns the power on/off, and the other which changes the power at the 2-pin connector between 12-volts and 24-volts. A power cord plugs into the 2-pin connector on the case and connects to the test items, such as commonly used solenoid valves, to provide a power supply to test the solenoid valves for electromechanical problems, or simply to cycle the valves if there is no control system yet configured to do so.

In one embodiment, a rechargeable direct current (DC) power supply disposed in a case, including: a plurality of rechargeable 12-volt batteries which are disposed in the case, and which provide a power supply to an item; a 2-pin connector which connects the item to the power supply; a first switch connected to the plurality of rechargeable 12-volt batteries, and separately to the 2-pin connector, the first switch which turns the power supply on/off at the 2-pin connector; and a second switch which changes the power supply at the 2-pin connector from 12-volts to 24-volts.

In one embodiment, the power supply further includes: a jack which accommodates a 12-volt battery charger to charge the plurality of rechargeable 12-volt batteries.

In one embodiment, the jack, the 2-pin connector, the first switch and the second switch are disposed on an external portion of the case.

In one embodiment, the power supply further includes a fuse which prevents power overload from the 2-pin connector or from the plurality of rechargeable 12-volt batteries.

In one embodiment, the item is a solenoid valve.

In one embodiment, on condition that the second switch is at 12-volts, an electrical connection of the plurality of rechargeable 12-volt batteries is in parallel, and on condition that the second switch is at 24-volts, the electrical connection of the plurality of rechargeable 12-volt batteries is in series.

In one embodiment, on condition that the 12-volt battery charger is inserted in the jack, the second switch is at 12-volts.

Thus, some features consistent with the present invention have been outlined in order that the detailed description thereof that follows may be better understood, and in order that the present contribution to the art may be better appreciated. There are, of course, additional features consistent with the present invention that will be described below, and which will form the subject matter of the claims appended hereto.

In this respect, before explaining at least one embodiment consistent with the present invention in detail, it is to be understood that the invention is not limited in its application to the details of construction and to the arrangements of the components set forth in the following description or illustrated in the drawings. Methods and apparatuses consistent with the present invention are capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for the designing of other structures, methods, and systems for carrying out the several purposes of the present invention. It is important, therefore, that the claims be regarded as including such equivalent constructions insofar as they do not depart from the spirit and scope of the methods and apparatuses consistent with the present invention.

BRIEF DESCRIPTION OF THE DRAWINGS

The description of the drawings includes exemplary embodiments of the disclosure and are not to be considered as limiting in scope.

DESCRIPTION OF THE INVENTION

The present invention relates to a portable, cordless, rechargeable power supply. More particularly, the present invention relates to a 12-volt/24-volt cordless rechargeable direct current (DC) power supply, which can be used to troubleshoot and cycle a desired item, such as a solenoid valve, to determine if there are any mechanical problems. In one embodiment, the present invention can also be used for cycling solenoid valves when a new system is built but the electrical or controls system is not configured yet to cycle the solenoid valve.

Figure 1A:
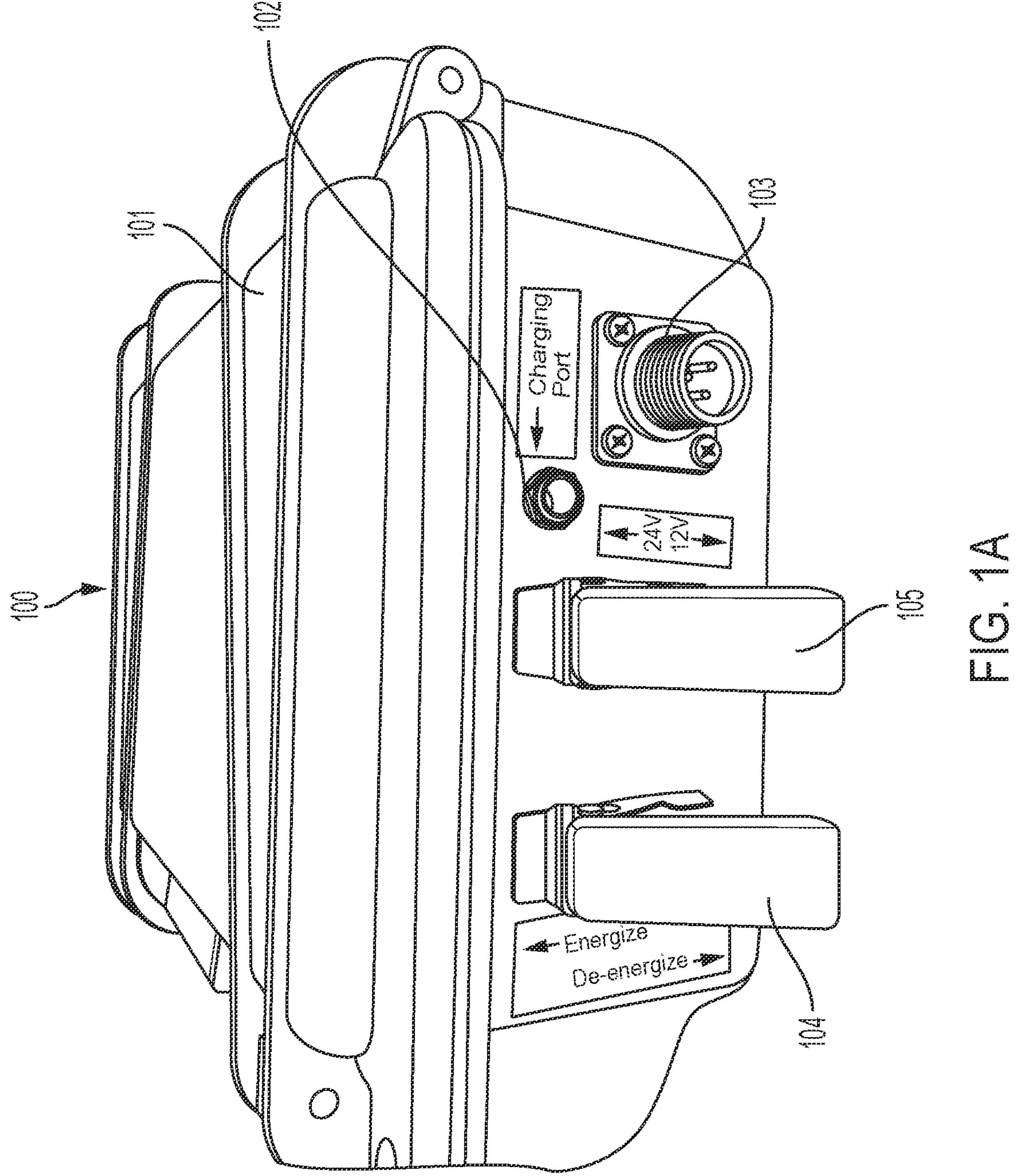
FIG. 1A shows an external view of a box or case of the portable, cordless, rechargeable 12-volt/24-volt power supply, according to one embodiment consistent with the present invention.
Figure 1B:
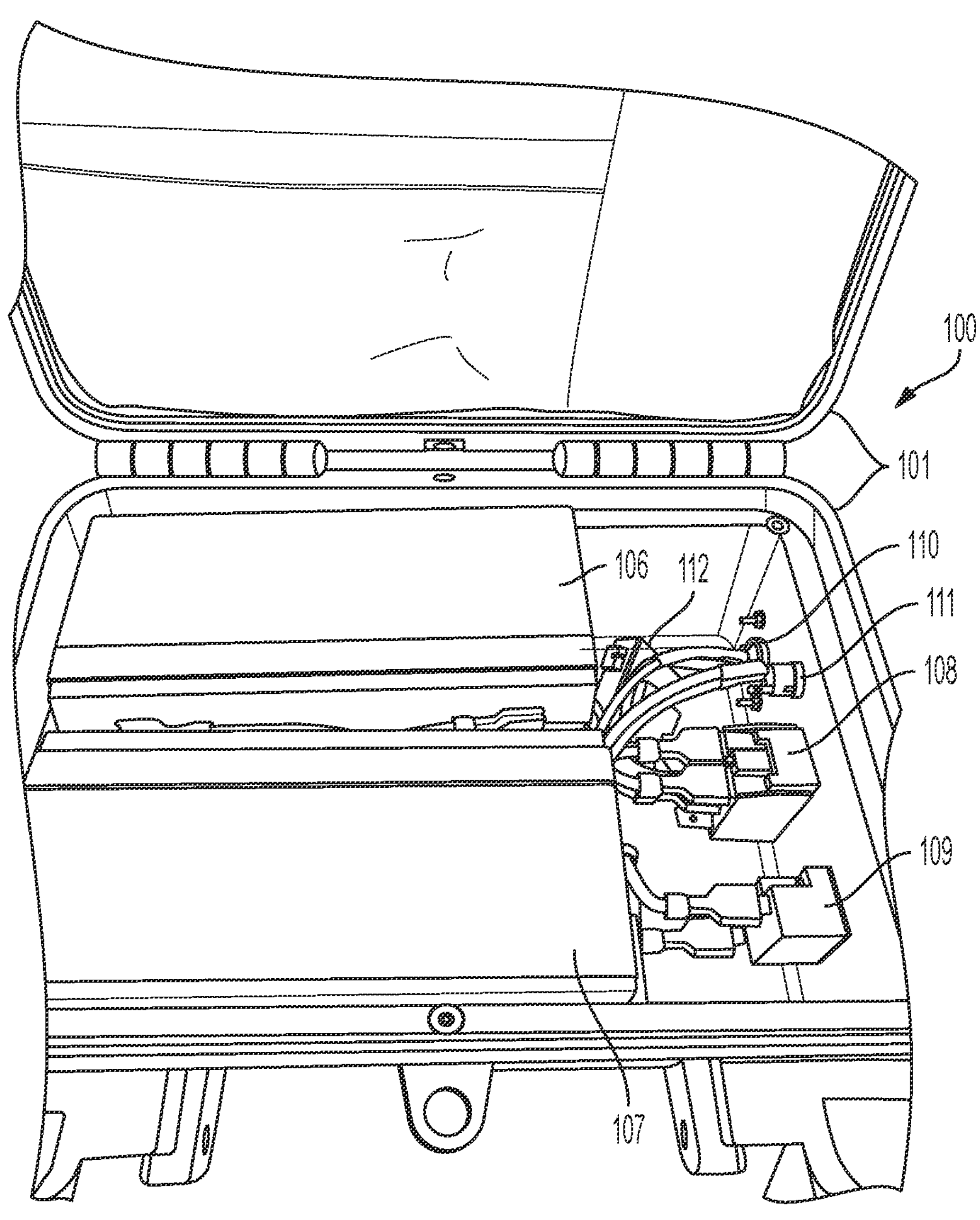
FIG. 1B shows an internal view of a box or case of the portable, cordless, rechargeable 12-volt/24-volt power supply, according to one embodiment consistent with the present invention.

In one embodiment, the cordless rechargeable 12-volt/24-volt (V) direct current (DC) power supply (hereafter, the "power supply") 100 (see FIGS. 1A-1B) of the present invention is provided in a relatively small box or case 101, which contains two (2) 12-volt rechargeable batteries 106, 107 inside. The small case allows the power supply 100 of the present invention to be portable and cordless.

In one embodiment, the power supply of the present invention includes a 2-pin power connector 103 on the exterior of the case 101 that is commonly used on items such as solenoid valves, including Marotta® and others.

In one embodiment, there are also two switches 104, 105 on the exterior of the case 101 adjacent to the charging port 102 and power connector 103.

In one embodiment, one switch 104 (i.e., the left switch in FIG. 1A) is flipped "up" to turn the power "on" (i.e., "Energize" vs. "De-Energize" in "down" position) at the 2-pin connector 103.

In one embodiment, the other switch 105 (the right switch in FIG. 1A) is flipped "up" to change the power at the 2-pin connector 103 between 12-volts and 24-volts (i.e., 24-volts shown as switch 105 "up", with switch "down" as 12-volts).

In one embodiment, the fuse 112 prevents power overload from the connector 103/solenoid valve or from the batteries 106, 107.

In one embodiment, the exterior of the case 101 includes a jack 102 for plugging in a standard 12-volt battery charger, which charges both batteries 106, 107 via internal wires 111.

In operation, in one embodiment, a power cord (not shown) plugs into the connector 103 on the case 101, and the other end of the power cord is connected to the item being tested (i.e., commonly used solenoid valves in the test complex such as Marotta®, ASCO®, or Flodyne®).

In one embodiment, after the power supply 100 is connected to the item (i.e., solenoid valve) via the power cord, the right switch 105 is flipped "up" for 24-volts (most commonly used in solenoid valves), and then the left switch 104 is flipped "up" to turn "on" the power supply device 100.

In one embodiment, when powered "on" (energized), with the switch 104 upward, the internal switch 109, which has one side that connects to the fuse 112 and which connects to the batteries 106, 107, and the other side which connects to the connector 110/103, closes and completes the electric circuit so that power is provided from the batteries 106, 107 to the connector 110/103. Thus, power is provided to the connector 103, and the desired item, such as a solenoid valve, can be cycled.

The right switch 105 is also flipped "up" for 24-volts, since in this embodiment, solenoid valves are commonly used at 24-volts. In this case, with the right switch 105 at 24-volts, the internal switch 108 changes how the batteries 106, 107 are wired—i.e., by changing the connection of the batteries 106, 107 from parallel (12-volts) to series (24-volts).

In one embodiment, after testing the item (i.e., solenoid valve), the left switch 104 is pushed "down", and the internal switch 109 is opened, breaking the electric circuit, and no power is provided from the batteries 106, 107 to the connector 110/103.

In one embodiment, to charge the batteries, a charging port 111/jack 102 accepts a standard 12-volt battery charger, which charges both batteries 106, 107 via internal wires 111, which are separate from the switch 104. However, during charging, the switch 105 should be in the "down" or 12-volt position for operation.

Thus, the present invention provides a power supply to an item under tests, such as solenoid valves, to determine if the item is operating correctly with no electromechanical problems. In one embodiment, the present invention can also cycle solenoid valves when there is no control system in place to do so.

The present invention may be used in any industry that uses items such as solenoid valves, including everything from commercial airliner manufacturers to oil refineries or rocket propulsion testing.

It should be emphasized that the above-described embodiments of the invention are merely possible examples of implementations set forth for a clear understanding of the principles of the invention. Variations and modifications may be made to the above-described embodiments of the invention without departing from the spirit and principles of the invention. All such modifications and variations are intended to be included herein within the scope of the invention and protected by the following claims.

What is claimed is:

1. A rechargeable direct current (DC) power supply disposed in a case, comprising:
- a plurality of rechargeable 12-volt batteries which are disposed in the case, and which provide a power supply to an item;
- a 2-pin connector which connects said item to said power supply;
- a first switch connected to said plurality of rechargeable 12-volt batteries, and separately to said 2-pin connector, said first switch which turns said power supply on/off at said 2-pin connector; and
- a second switch which changes said power supply at said 2-pin connector from 12-volts to 24-volts.

2. The power supply of claim 1, further comprising:
- a jack which accommodates a 12-volt battery charger to charge said plurality of rechargeable 12-volt batteries.

3. The power supply of claim 2, wherein said jack, said 2-pin connector, said first switch and said second switch are disposed on an external portion of said case.

4. The power supply of claim 1, further comprising:
- a fuse which prevents power overload from said 2-pin connector or from said plurality of rechargeable 12-volt batteries.

5. The power supply of claim 1, wherein said item is a solenoid valve.

6. The power supply of claim 1, wherein on condition that said second switch is at 12-volts, an electrical connection of said plurality of rechargeable 12-volt batteries is in parallel, and on condition that said second switch is at 24-volts, said electrical connection of said plurality of rechargeable 12-volt batteries is in series.

7. The power supply of claim 2, wherein on condition that said 12-volt battery charger is inserted in said jack, said second switch is at 12-volts.

* * * * *